United States Patent [19]
Bergemann et al.

[11] 4,453,736
[45] Jun. 12, 1984

[54] CONTROL ARRANGEMENT FOR A PNEUMATICALLY CUSHIONED VEHICLE

[75] Inventors: Klaus-Dieter Bergemann, Hanover; Bernd-Joachim Kiel, Wunstorf; Heinz-Werner Konig, Barsinghausen; Karl-Heinz Deike, Pattensen, all of Fed. Rep. of Germany

[73] Assignee: WABCO Fahrzeugbremsen GmbH, Hanover, Fed. Rep. of Germany

[21] Appl. No.: 417,299

[22] Filed: Sep. 13, 1982

[51] Int. Cl.³ .............................................. B60G 17/04
[52] U.S. Cl. ................................. 280/711; 267/64.11; 280/714
[58] Field of Search ............... 267/22 R, 64.11–64.28, 267/121, 122, 123; 303/22 A, 23 A, 22 R, 23 R; 188/195, 152; 280/714, 711, 693, 702; 137/627.5, 111–114

[56] References Cited

U.S. PATENT DOCUMENTS

| | | | |
|---|---|---|---|
| 2,950,147 | 8/1960 | Neubeck | 303/22 A |
| 3,063,734 | 11/1962 | Davies et al. | 280/714 |
| 3,071,394 | 1/1963 | Miller | 280/714 |
| 3,145,032 | 8/1964 | Turek | 280/714 |
| 4,077,676 | 3/1978 | Hata | 303/22 A |
| 4,231,554 | 11/1980 | Ekonen et al. | 280/714 |

FOREIGN PATENT DOCUMENTS

| | | |
|---|---|---|
| 2012203 | 9/1971 | Fed. Rep. of Germany . |
| 2435099 | 2/1975 | Fed. Rep. of Germany . |
| 2548351 | 5/1977 | Fed. Rep. of Germany ... 267/64.11 |
| 2718168 | 10/1978 | Fed. Rep. of Germany ...... 280/714 |
| 2740264 | 3/1979 | Fed. Rep. of Germany . |
| 2925190 | 2/1981 | Fed. Rep. of Germany . |
| 2238605 | 2/1975 | France . |
| 2329466 | 5/1977 | France . |
| 936001 | 9/1963 | United Kingdom . |

*Primary Examiner*—Douglas C. Butler
*Attorney, Agent, or Firm*—J. B. Sotak

[57] ABSTRACT

This invention relates to a control system for a pneumatically cushioned vehicle having at least a first and a second pneumatically cushioned axle. The pressure in the air spring bellows of the second axle is controlled in accordance with the air spring bellows of the first axle. The air spring bellows of the second axle are connected to a source of supply pressure by a pneumatic relay valve. The relay valve includes a control inlet which is connected with the air spring bellows of the first axle. The relay valve is designed in such a way, that if no pressure or a relatively low control pressure is present at the control inlet, the pressure at an outlet port of the relay valve leading to the air spring bellows of the second axle will be maintained at a minimum value. The relay valve includes a first control chamber and a second control chamber which are separated by a relay piston. The piston of the relay valve is biased by a compression spring which establishes a predetermined level of the pressure initially entering the air spring bellows of the second axle in the event of subsequent pressure loss.

5 Claims, 4 Drawing Figures

CONTROL ARRANGEMENT FOR A PNEUMATICALLY CUSHIONED VEHICLE

FIELD OF THE INVENTION

This invention relates to a control arrangement for a vehicle which is equipped with pneumatic cushioning apparatus and, more particularly, to a pneumatic load control system having a relay piston control valve which includes a first control chamber which is responsive to the air pressure in the air spring cushioning bellows of the first vehicle axle to establish a minimum air pressure in the air spring cushioning bellows of the second vehicle axle when the air pressure in the air spring cushioning bellows of the first vehicle axle falls to zero pressure and which includes a second control chamber which is pressurized from an air pressure supply source to establish air pressure in the air spring cushioning bellows of the second vehicle axle in accordance with the air pressure in the air spring cushioning bellows of the second vehicle axle.

BACKGROUND OF THE INVENTION

In control arrangements of the type to be described are used to regulate the pressure of the air spring bellows in pneumatically cushioned commercial vehicles so that they are capable of withstanding heavy loads. Normally, the vehicles have three axles for carrying the heavy load with two of the axles fastened together into a double axle set. When vehicles of this type are in general use, all of the axles do not always sustain the maximum load, i. e., the vehicle periodically runs empty or is very lightly loaded so that one axle could easily handle the load.

As shown and described in the published German patent application No. DE 29 25 190, the second axle of the double axle set is periodically relieved of stress to minimize wear. This is accomplished by establishing the pressure in the air spring bellows of the second axle in accordance with the pressure in the air spring bellows of the first axle.

In the construction as disclosed in the above German patent application No. DE 29 25 190, a pressure regulating valve is adapted to have a movable control plunger. The plunger is constructed as a step-piston which moves against the force of a governing spring. The steps of the piston having effective surfaces which are in equal size and are acted upon in the same direction by the pressurized air from the air spring bellows of a vehicle axle. The first control piston regulates a first control chamber which is connected to the two air spring bellows of the first vehicle axle by a changeover valve. The changeover valve is constructed in such a manner that the pressurized air from the two air spring bellows reaches the first control chamber when the air spring bellows and connecting lines are intact. If an air spring bellow is totally or partially inoperative, the function of the pressure regulating valve is entirely maintained by the pressurized air from the second air spring bellow. The first control chamber can be connected to a second control chamber by a multi-way valve which is connected to the air spring bellows of a second vehicle axle. The second control chamber is regulated by a movable control piston which is set against the force of a spring and is acted upon by the pressurized air from the air spring bellows of the second vehicle axle and which is in opposition to the first control piston. The first control piston and the second control piston are connected to each other by a drag link which is part of the multi-way valve. The special construction and connection between the two control pistons in the pressure regulating valve results in a specific operating performance of the pressure regulating valve possible.

However, such a previous arrangement has the disadvantage of being relatively expensive to construct. Although it is certain that when the pressure in one air spring bellow of the first vehicle axle fails, the pressure in the air spring bellows of the second vehicle axle will continue to be regulated without interruption, however, if both of the air spring bellows of the first vehicle axle fail, the air spring bellows of the second vehicle axle will also lose pressure.

OBJECTS AND SUMMARY OF THE INVENTION

Therefore, it is an object of this invention to provide a control arrangement of the above-mentioned type which is simple and inexpensive to manufacture and which offers the capability of maintaining a minimum pressure in the air spring bellows of the second vehicle axle in the instances where all pressure is lost in the air spring bellows of the first vehicle axle or in the case where the pressure is too low.

The object of this invention is to provide a control arrangement for a pneumatically cushioned vehicle having a first and a second pneumatically cushioned axle whereby the pressure in the air spring bellows of the second vehicle axle is controlled in accordance with the air spring bellows of the first vehicle axle, characterized by a relay valve, said relay valve includes a control inlet means connectable to the air spring bellows of the first vehicle axle, said relay valve includes a pressure inlet means connectable to a source of supply pressure, said relay valve includes a pressure outlet means connectable to the air spring bellows of the second vehicle axle, and said relay valve maintains the level of the pressure at the pressure outlet means at a minimum value even when little, if any, pressure exists at the control inlet means.

In accordance with this invention, the control arrangement offers the advantages of being able to establish and maintain a minimum pressure in the air spring bellows of the second axle at all times.

In addition, there is no need to install a changeover valve between the air spring bellows connections and the air spring bellows supplying the control pressure.

Further, it is possible to keep the pressure in the air spring bellows of the second vehicle axle at a predetermined pressure level independent of the control pressure from the air spring bellows. It is also possible to raise it to a value lying above that of the pressure in the air spring bellows of the first vehicle axle.

BRIEF DESCRIPTION OF THE DRAWINGS

The above objects and other attendant features and advantages of this invention will be better understood by referring to the following detailed description when considered in conjunction with the accompanying drawings, wherein.

DETAILED DESCRIPTION OF THE INVENTION

Figure 1:
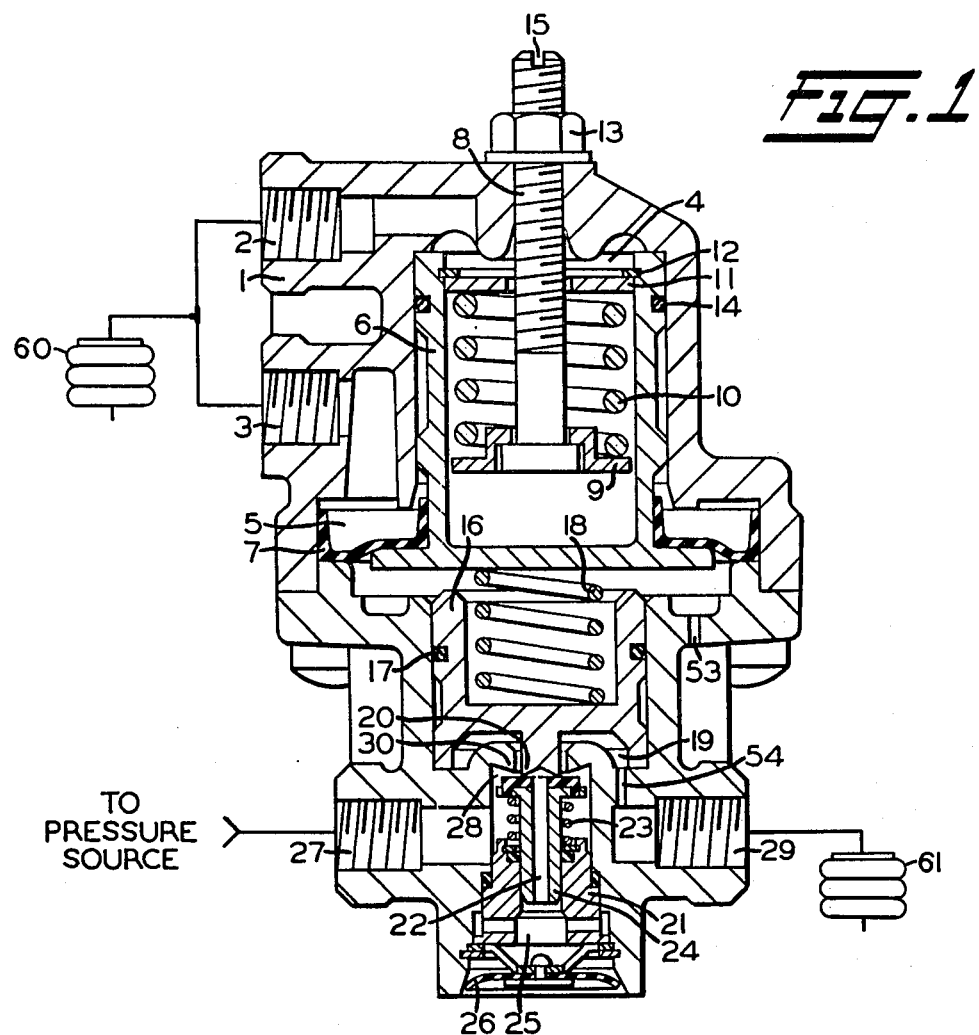
FIG. 1 illustrates a pneumatic relay valve having separate relay piston members and two inlet ports receiving the control air from the air spring bellows of one vehicle axle and an inlet port which is connected to a source of pressure supply which supplies an outlet port which is connected to the air spring bellows of another vehicle axle.

Referring now to the drawings and in particular to FIG. 1, there is shown a pneumatic relay control valve 1 including a duplex plunger which takes the form of a pair of reciprocable relay piston members 6 and 16. As shown, a first control chamber which is divided into two separate annular compartments 4 and 5 located in the upper portion of the housing of valve 1. The control chambers 4 and 5 are pressurized via two control inlets 2 and 3, respectively, which are connected to the air spring bellows 60 of the first axle of the motor vehicle. The first control chamber 4, 5 is varied by the first movable relay piston member 6. The relay piston 6 is constructed of a hollow cylindrical member which is internally suspended within the valve housing by a flexible circular diaphragm 7. The ring-shaped rubber diaphragm 7 is formed with an inner and outer enlarged flange. The inner flange engages and seals around the outer cylindrical surface of the relay piston member 6. The outer annular flange is arranged to seal the outer periphery and is adapted to fit into a corresponding recess formed in valve housing 1.

A taphole is formed in the top of the valve housing 1 for accommodating a threaded bolt 8. The bottom of bolt 8 juts into the relay piston member 6 and has a spring retaining washer 9 mounted on its free end. The upper end of bolt 8 is provided with a screwdriver slot 15 which is used for adjustment purposes. A primary compression spring 10 is disposed between the upper side of the washer 9 and the under side of another spring retaining washer 11. The spring assembly is held in place by a snap ring 12 which fits into an annular slot formed in the inner wall of relay piston member 6. A self-sealing lock nut 13 has been screwed on the upper end of the thread bolt 8 which extends out of the top of valve housing 1. Thus, after the bolt 8 is initially adjusted to establish the correct force of the compression spring 10, the bolt 8 is secured by means of tightening the nut 13. As shown, a gasket sealing ring 14 is fitted into an annular slot formed in the wall of the relay plunger part 6. Thus, the O-ring 14 seals the annular chamber 4 which forms part of the first control chamber and at the same time serves as a piston guide with the bore in housing 1. The annular chamber 5 also serves as a part of the first control chamber and is adapted to accommodate the sealing flexible diaphragm 7. It will be seen that below the first relay piston member 6 and the upper bore of the valve housing 1, there is provided a second relay piston member 16 which is disposed in a lower bore. The piston member 16 is biased downwardly by the force of a second compression spring 18. Thus, the second hollow cylindrical relay piston member 16 is reciprocally movable within the lower bore of valve housing 1. As shown, the second compression spring 18 is situated in a hollow cavity of the piston 16 and has one end resting against the top side of the base of the second relay piston 16 while the other end of the compression spring 18 rests against the underside of the base of the first relay piston member 6. An O-ring seal 17 is fitted into an annular slot formed in the outer wall of the second relay piston member 16. The O-ring 17 seals the lower bore against leakage for the second relay piston 16. Thus, the sealed area forms a second control chamber 19 which provides an interaction between the first relay plunger piston 6 and the second relay piston member 16. The second relay plunger piston 16 includes a lower protrusion or extension portion which functions as exhaust valve seat 20. The second control chamber 19 cooperates with an inlet pressure chamber 28 through a port from a housing cross-piece portion which serves as an inlet valve seat 30. The inlet pressure chamber 28 has one end connected to a pressure inlet port 27 which is, in turn, connected to a pressure supply source, such as a pressure reservoir (not shown) and has the other end connected to the air spring bellows 61 of a second axle of the motor vehicle (also not shown) by means of a pressure exhaust port 29. A tubular body member 21 is installed in the pressure inlet chamber 28. The bore of the member 21 runs in a longitudinal direction and serves as a guide for the elongated cylindrical body of a double-seated shut-off valve 24. The longitudinal bore 22 of the double-seated shut-off valve 24 is capable of interconnecting the second control chamber 19 with passageway 25 which leads to atmosphere via a vent shield 26 which is situated in the bottom end of the valve housing 1. As shown, a compression spring 23 is situated between the upper end of valve 24 and the top of guide body 21 to bias the double-seated shut-off valve 24 against the exhaust valve seat 20.

In order to avoid the formation of an air pocket which could result in a dash-pot effect, it is expedient to connect the area under diaphragm 7 between the relay plunger parts 6, 16 with the atmosphere via a bore hole 53. A choke or small port 54 is provided between the second pressure chamber 19 and the pressure exhaust port 29 to permit a restricted flow rate from chamber 19.

Figure 2:
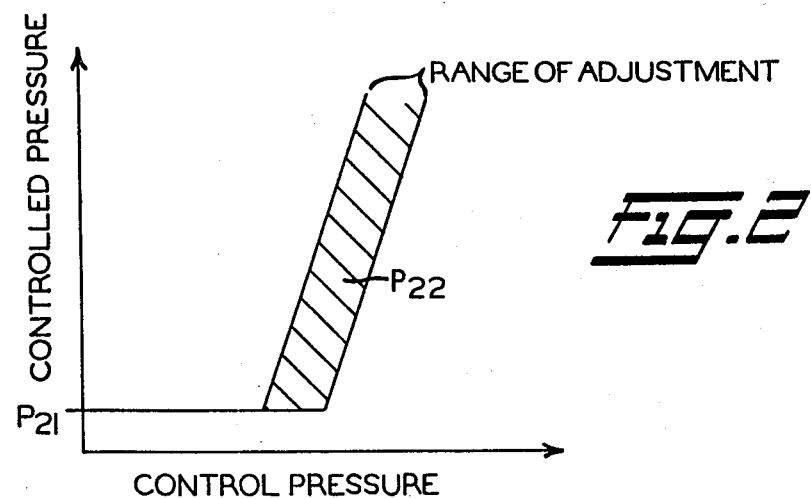
FIG. 2 is a pressure response curve of the controlled pressure versus the control pressure of the relay valve of FIG. 1.

The operation of the relay valve 1 will now be described in which it is assumed that the valve is properly functioning and that the components or parts are in the positions as shown in FIG. 1 of the drawings. Further, it will be assumed that pressurized air is being fed from the air spring bellows 60 on one side of the first axle of the vehicle to the pressure inlet port 2 and, in turn, to the annular chamber 4 which forms one part of the first control chamber and that pressurized air is supplied from the air spring bellows 60 on the other side of the same vehicle axle to the pressure inlet port 3 and, in turn, to the annular chamber 5 which forms another part of the first control chamber of the relay valve 1. It will be appreciated that the force of the compression spring 18 on the reciprocable piston 16 holds the inlet valve 24 away from seat 30. Thus, the double-seated shut-off valve 24 is held open in opposition to the compression spring 23. Accordingly, pressurized air from the pressure supply reservoir will flow to the pressure inlet 27 through the opened inlet double-seated shut-off valve 24, past inlet valve seat 30, into the second control chamber 19, to pressure medium exhaust 29 and into the air spring bellows 61 of a second vehicle axle. The exhaust valve seat 20 of the double-seated shut-off valve 24 is held closed during this operating phase by the force of the compression spring 23 which opposes the force of the second compression spring 18 on the piston member 16. Now if the pressure builds up in the second control chamber 19 to the point where it moves the second relay piston member 16 upwardly against the compression spring 18, the double-seated shut-off valve 24 follows due to the force of compression spring 23. As the valve 24 moves upwardly, it seals off the pressure inlet chamber 28 by seating against the inlet valve seat 30 so that the pressure is trapped within the second control chamber 19. Thus, the pressure in the exhaust port 29 and, in turn, in the air spring bellows of the second vehicle axle is maintained at a level $P_{21}$ during this operating phase as shown in FIG. 2.

Now, if the pressure builds up in the first control chamber 4, 5, it will eventually overcome the forces of the compression springs 10 and 18. Thus, first relay piston member 6 will be shifted in the direction towards the second relay piston 16 until the base of the piston 6 engages the top of piston 16. Further movement of piston 6 causes the second relay piston 16 to unseat the double-seated shut-off valve 24 from the inlet valve seat 30.

Now, the air pressure from the supply reservoir will reenter the second control chamber 19 through the inlet port 27 and pressure intake chamber 28 and, in turn, will be conveyed to the air spring bellows of the second vehicle axle. The pressurized air will continue to be channeled into the second control chamber 19, and, in turn, into the air spring bellows of the second vehicle axle until the pressure in the second control chamber 19 reaches a point where an equilibrium is reached between the opposing forces acting on the two relay piston members 6 and 16. At this point, the intake valve 30, 24 will be closed, and the pressure in the air spring bellows 61 of the second vehicle axle will be maintained at some level with the range $P_{22}$ as shown in FIG. 2.

Now, if the pressure in the first control chamber 4, 5 drops, then the first relay piston member 6 will be moved upwardly by the force of the first compression spring 10 to assume its original position. This reduces the tension on the second compression spring 18 so that the loading on the second relay piston member 16 is decreased.

If the pressure in the air spring bellows 60 of the first vehicle axle and in the first control chamber 4, 5 reaches a value which is below the value of the pressure in the second control chamber 19, the second relay piston 16 will be moved in the direction toward the first relay piston 6. The upward movement of the piston 16 will first close the inlet valve seat 30 by the double-seated shut-off valve 24 to shut off the pressure supply reservoir leading to port 27. Further upward movement of the piston 16 by the pressure in the second control chamber 19 and the air spring bellows of the second vehicle axle results in the unseating of the exhaust valve seat 24 by the double-seated shut-off valve 24. Thus, the air spring bellows 61 of the second vehicle axle and the second control chamber 19 are opened to the atmosphere through bore 22, passageway 25, and past vent shield 26 to cause a pressure reduction until an equilibrium occurs.

The pressure in the air spring bellows 60 of the first vehicle axle and the second control chamber 19 will decrease to a value which corresponds to the force of the second compression spring 18. At which time, the double-seated shut-off valve will seat against the exhaust valve seat 20 to close off passageways 22, 24 which lead to atmosphere. The supply of pressurized air to the air spring bellows 61 of the second vehicle axle will remain at the constant level $P_{21}$ since the inlet valve 24, 30 is also closed. Thus, a change of pressure will not occur in the air spring bellows 60 of the first vehicle axle until the first control chamber 4, 5 is again pressurized to activate the double-seated valve 20, 22, 24, 30 which will then cause the pressure in the air spring bellows of the second vehicle axle to change to some level in range $P_{22}$.

The working surfaces or effective pressure areas of the two relay piston members 6 and 16 can be proportioned in such a manner that a high degree of pressure change can be achieved in the air spring bellows of the second vehicle axle with a relatively low degree of change from the air spring bellows 60 of the first vehicle axle. If for any reason, the air pressure in the air spring bellows of the first vehicle axle drops to zero, a given amount of pressure is always maintained in the air spring bellows 61 of the second vehicle axle. This prevents a total loss of shock absorbing ability in both vehicle axles since it is highly unlikely that all the air spring bellows will fail or lose their pressure at the same time. The amount of pressure maintained in the bellows in the second vehicle axle is dependent upon the strength and force of the second compression spring 18 which acts upon the second relay plunger part 16.

As mentioned above, FIG. 2 shows a graphical representation of the pressure response of the relay valve 1 of FIG. 1 in which a minimum controlled pressure $P_{21}$ is maintained in the air spring bellows of the second vehicle axle and in which at some level of control pressure, the controlled pressure changes proportionally within the range $P_{22}$ which may be varied by adjusting the thead bolt 8.

Figure 3:
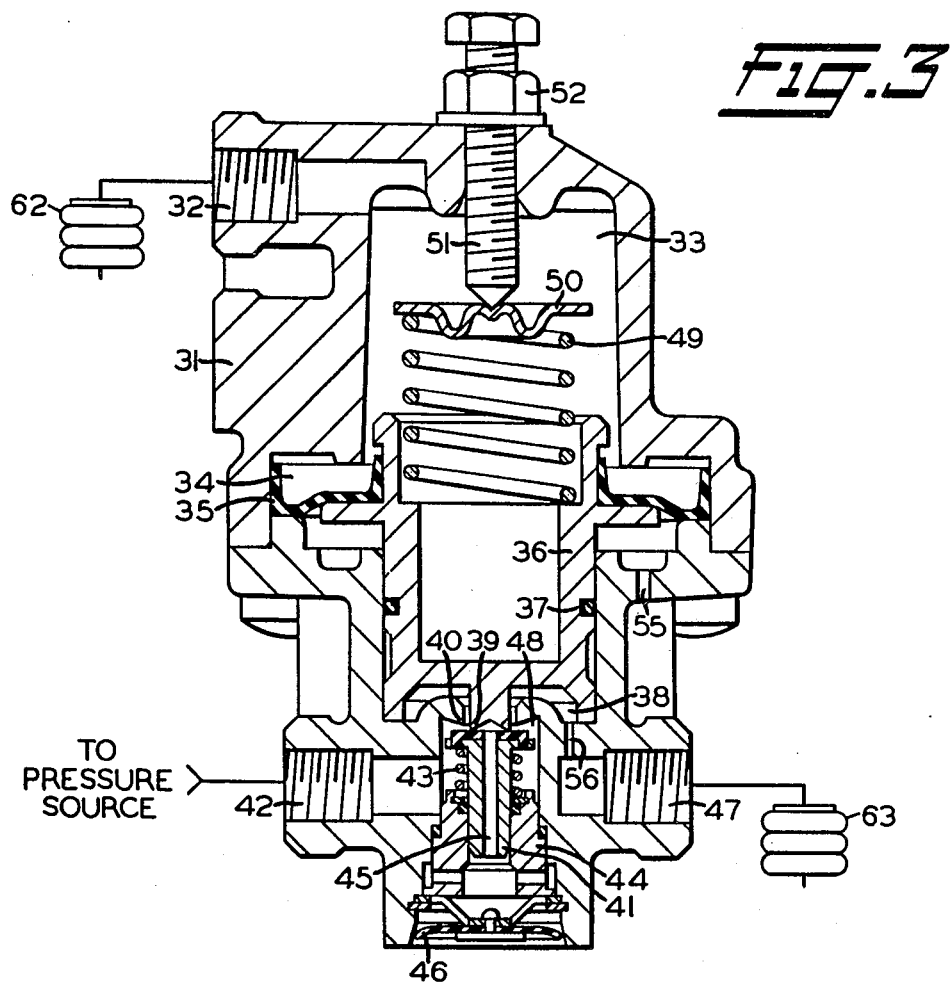
FIG. 3 illustrates another embodiment of a relay valve which may be used in conjunction with the respective air springs of the vehicle.

Referring now to FIG. 3, there is shown another embodiment of a relay control valve having a pressure control inlet 32 which is located in a valve housing 31. The inlet 32 is connected to a first control chamber 34 by way of a spring compartment 33 which is formed in the upper portion of the valve housing 31. The pressurized air supplied to inlet 32 is generated in the air spring bellows 62 of a first vehicle axle. The first control chamber 34 is varied by a relay piston 36 which is designed as a hollow plunger member. A ring-shaped membrane or annular diaphragm 35 supports and seats the piston 36 in relation to the inside of the housing 31. A compression spring 49 has one end engaging a step portion the underside of a spring retaining washer 50. The spring force is adjustable by moving the washer 50 by a screw 51 which is screw threaded into a taphole formed in the top of the valve housing 31.

A self-sealing lock nut 52 is threaded on the screw 51 for locking it against undesired movement. A fluid pressure inlet port 42 which is formed in the lower part of the valve housing 31 to convey a source of pressure from a suitable storage tank or reservoir to an inlet control chamber 48, to a second control chamber 38 and, in turn, to a fluid pressure outlet or exhaust port 47 Which is connected to the air spring bellows 63 of a second vehicle axle. The second control chamber 38 is similarly controlled by the relay piston member 36. An O-ring 35 provides a seal between the inner wall of the bore in housing 31 and the periphery of the piston 36. As shown, the O-ring seal 37 is seated in an annular slot formed in the periphery of the piston 36. Thus, the second control chamber 38 is sealed so that it is under the influence of the pressure in chamber 38. An extension is provided on the lower end of the relay piston 36. The extension protrudes into the inlet chamber 48 through a hole formed in the bottom housing wall which divides the inlet chamber 48 from the second control chamber 38. The lower annular edge of the extension serves as an exhaust valve seat 39 while the annular rim of the hole in the bottom housing wall is designed as the inlet valve seat 40. An annular tubular body 44 is provided with a central bore which runs in an axial direction. The central bore of the body 44 serves to accept and guide a double-seated shut-off valve 41. The double-seated shut-off valve 41 is biased upwardly by a compression spring 43 which is disposed between an enlarged flange formed on the upper end of the valve 41 and an annular groove formed in the top of body 44. A central bore 45 is axially formed in the double-seated shut-off valve 41. The axial bore 45 is in communication with an exhaust port shield 46 which is located in the bottom end of the valve housing 31 so that the second control chamber 38 can be connected to atmosphere.

In order to prevent an air cushioning effect, it is expedient to vent the space below the diaphragm 35 to atmosphere via bore hole 55.

A choke or restricted bore 56 is provided between the pressure outlet port 47 and second control chamber 38 to accommodate for sudden pressure changes in second control chamber 38.

The operation of the relay valve of FIG. 3 will now be explained and it will be beneficial to refer to the control-controlled pressure curve of FIG. 4.

Let us assume that the first control chamber 34 of the relay valve is being supplied with the pressurized air from the air spring bellows 62 of a first vehicle axle through the control inlet port 32 via the spring 33. At the same time, pressurized air is supplied from a pressure supply reservoir to the inlet port 42. The air spring bellows 63 of a second vehicle axle are pressurized from the pressure inlet port 42 through the inlet chamber 48 over the opened inlet valve 40, 41 through the second control chamber 38 and via the pressure exhaust port 47. The pressure buildup in the second control chamber 38 causes the relay piston 36 to work against the force of the compression spring 49 and the load exerted by the pressure from the air spring bellows 62 of the first vehicle axle on the upper surface of the relay piston 36. If the relay piston 36 moves upwardly a specific distance due to the buildup of pressure in the second control chamber 38, the double-seated shut-off valve 41 will move against the inlet valve seat 40. Thus, the inlet valve 40, 41 will become closed so that the air pressure being supplied from the pressure supply to the air spring bellows 63 of the second vehicle axle is cut off. The pressure in the air spring bellows 63 of the second vehicle axle will remain at a level with a pressure range $P_{23}$ as shown in FIG. 4.

Now, if the pressure in the air spring bellows 62 of the first vehicle axle continues to rise, the pressure buildup in the first control chamber 34 will overcome the constant pressure in the second control chamber 38 so that the piston 36 will be moved downwardly. Thus, the double-seated shut-off valve 41 will become unseated from the inlet valve seat 40 by the piston extension so that the pressurized air from the air pressure supply reservoir again flows into the air spring bellows 63 of the second vehicle axle.

Now, if the air pressure in the air spring bellows 62 of the first vehicle axle and the first control chamber 34 falls below a given value, namely, to a point where predetermined differential exists between the pressure in the air spring bellows 62 of the first vehicle axle and the pressure in the air spring bellows 63 of the second vehicle axle, the relay piston 36 will be moved upwardly by the pressure in the second control chamber 38. As the piston 36 is retracted into the first control chamber 34, the inlet valve 40, 41 will initially become closed so that the inlet supply source is cut off and the pressure is trapped in chamber 38. Then as the piston 36 continues to move upwardly, the exhaust valve seat 39 will become unseated from the double-seated shut-off valve 41. Thus, the pressurized air in the second control chamber 38 is vented to atmosphere through the opened exhaust valve 39, 41 and through the shielded port 46, and thus the air pressure in the air spring bellows 63 of the second vehicle axle begins to decrease. It will be seen that if the pressure in the air spring bellows 63 of the second vehicle axle and the second control chamber 38 falls below the predetermined value which is set by the compressive force of the compression spring 49, then the exhaust valve 39, 41 again closes. The inlet valve 40, 41 remains closed until the control piston 36 is again moved downwardly toward the second control chamber 38 which is caused by an increase in the air pressure in the air spring bellows 62 of the first vehicle axle which is reflected by a proportional increase in the pressure of the first control chamber 34. The compression spring 49 is initially adjusted in such a manner that the inlet valve 40, 41 is held in the open position in cases when the air pressure in the first control chamber 34 is lost due to leakage or failure. A minimum amount of pressure is always maintained in the air spring bellows 63 of the second vehicle axle even if the control pressure disappears or the pressure in the first control chamber 34 is too low.

Figure 4:
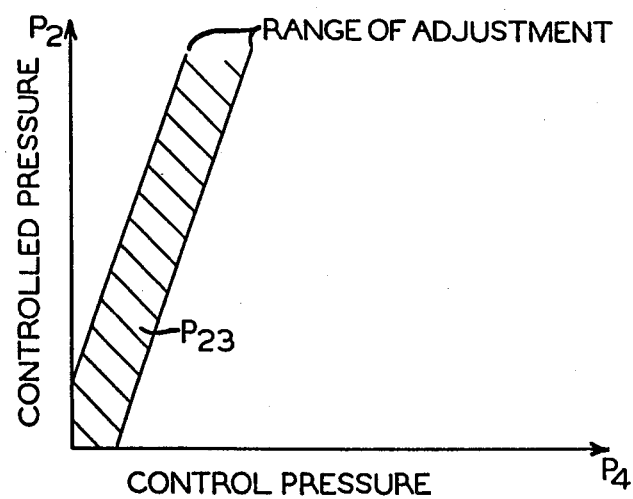
FIG. 4 is a response curve showing the controlled pressure versus the control pressure of the relay valve of FIG. 3.

It will be understood that the range of adjustment shown in FIGS. 2 and 4 is dependent upon the amount of linear movement that is obtainable by turning the threaded bolts 8 and 51 either all the way in or all the way out to set the upper and lower limits of the control pressure.

It will be appreciated that various alterations and changes may be made by those skilled in the art without departing from the spirit and scope of the subject invention. Therefore, it will be appreciated that certain modifications, ramifications, and equivalents will be readily apparent to persons skilled in the art, and accordingly it is understood that the present invention should not be limited to the exact embodiment shown and described, but should be accorded the full scope and protection of the appended claims.

Having now described the invention what I claim as new and desire to secure by Letters Patent, is:

1. A control arrangement for a pneumatically cushioned vehicle having a first and a second pneumatically cushioned axle whereby the pressure in an air spring bellows of the second vehicle axle is controlled in accordance with an air spring bellows of the first vehicle axle, characterized by:
   (a) a relay valve,
   (b) said relay valve includes a control inlet means connectable to the air spring bellows of the first vehicle axle,
   (c) said relay valve includes a pressure inlet means connectable to a source of supply pressure,
   (d) said relay valve includes a pressure outlet means connectable to the air spring bellows of the second vehicle axle, and (e) said relay valve maintains the level of the pressure at the pressure outlet means at a minimum value even when little, if any, pressure exists at the control inlet means.

2. The control arrangement as defined in claim 1 wherein:
(a) relay valve includes a first and a second relay plunger,
(b) said first relay plunger limits at least one control chamber which is connected with the control inlet means,
(c) said second relay plunger limits a second control chamber which is connected with a pressure medium outlet,
(d) a compression spring is located between the first relay plunger and the second relay plunger,
(e) the second control chamber can be connected over a multi-way valve with an inlet chamber which is connected with a pressure medium inlet, and
(f) the second relay plunger part has an operating connection with the multi-way valve.

3. The control arrangement as defined in claim 2, wherein a choke bore is between said second control chamber and said pressure outlet means.

4. The control arrangement as defined in claim 1, wherein said relay valve includes a pair of relay plungers one of which takes the form of a diaphragm piston.

5. The control arrangement as defined in claim 1, wherein said relay plunger includes a single relay plunger which takes the form of a diaphragm piston.

* * * * *